United States Patent [19]

Walsh et al.

[11] Patent Number: 5,886,681
[45] Date of Patent: Mar. 23, 1999

[54] WIDE-RANGE DUAL-BACKLIGHT DISPLAY APPARATUS

[76] Inventors: Kevin L. Walsh, 5742 Williamsburg Dr., Norcross, Ga. 30093; Robert M. Merrifield, 1052 Mountain Woods Ct., Stone Mountain, Ga. 30087; Kevin C. Kelleher, 1106 Talon Ct., Lawrenceville, Ga. 30243; Robert J. Vitello, 2017 Parsons Ridge Cir., Duluth, Ga. 30155

[21] Appl. No.: 663,894

[22] Filed: Jun. 14, 1996

[51] Int. Cl.$^6$ ..................................................... G09G 3/36
[52] U.S. Cl. ........................... 345/102; 345/211; 362/26; 362/29
[58] Field of Search ............................ 345/102, 87, 211; 362/31, 23, 26, 29

[56] References Cited

U.S. PATENT DOCUMENTS

| | | | |
|---|---|---|---|
| 5,143,433 | 9/1992 | Farrell | 362/29 |
| 5,211,463 | 5/1993 | Kalmanash | 362/26 |

*Primary Examiner*—Richard A. Hjerpe
*Assistant Examiner*—Kent Chang
*Attorney, Agent, or Firm*—Perman & Green, LLP

[57] ABSTRACT

A backlight display system having a display screen illuminated directly by high intensity daylight lamps and illuminated indirectly by lower intensity nightlight lamps positioned to reflect their light off the daylight lamps and onto the display screen. The backlight display system includes intensity gradient filters and/or distribution lenses to enhance the uniformity of reflected nightlight, a brightness enhancement filter/diffuser disposed before the display screen, and optical filtering positioned between the illumination sources and the display screen. Photosensor controlled intensity feedback is used to provide smooth continuous dimming transition from a wide range of maximum to minimum intensity. The system also provides a third monochromatic nightlight lamp array for "class A" Night Vision Imaging System (NVIS) compatibility and an override switch to assure that lighting restrictions needed for night-vision are maintained. The system thus provides illumination of the display screen for operating during daytime conditions, nighttime conditions, nighttime conditions of Class A NVIS device use, and nighttime conditions of Class B NVIS device use.

15 Claims, 7 Drawing Sheets

WIDE-RANGE DUAL-BACKLIGHT DISPLAY APPARATUS

BACKGROUND OF THE INVENTION

1. Field of the Invention

The present invention pertains to backlight displays and more particularly to wide-range dual-level lighting for backlight displays for avionics applications.

2. Discussion of Related Art

Avionics Liquid crystal display (LCD) units used for avionic applications are often provided with two light-intensity levels. A first, higher intensity level is used for direct backlighting for daylight viewing conditions. A second, lower intensity level just bright enough for viewing at night, is employed when the user's eyes are fully dark-adapted.

U.S. Pat. No. 5,211,463 issued May 18, 1993 to Kalmanash entitled BACKLIGHT FOR LIQUID CRYSTAL DEVICES and U.S. Pat. No. 5,143,433 issued Sep. 1, 1992 to Farrell entitled NIGHT VISION BACKLIGHTING SYSTEM FOR LIQUID CRYSTAL DISPLAYS both disclose systems using a first daylight illumination light source and a second nightlight illumination light source.

Fluorescent lamps are particularly well-suited for providing the backlighting needed for LCD display panels because they can be embodied as long serpentine tubes having a narrow-cross section, providing a thin, even illumination over a wide area.

The electrical characteristics of fluorescent lamps however, present problems in avionics displays, where night vision is critically important and the illumination must be smoothly variable from daylight to nightlight over a wide range of luminance values. When the same fluorescent lamps that are used for higher intensity daylight viewing of LCD displays are also used for lower intensity night lighting applications, the range of usable light-intensity is severely restricted because when operated at low light-intensity night lighting levels, the luminance level of fluorescent lamps is unstable. This is due to electrostatic forces within the lamp that produce a non-uniform glow that varies with time and is unevenly distributed along the lighted arc. To overcome this problem and permit the fluorescent lamps being used to operate within their respective, rather narrow, stable luminance ranges, a separate set of additional lamps is frequently used that is specifically selected to provide the low-level luminance needed for night-time use.

Some problems with the use of separate nightlight fluorescent lamps is that the dimming characteristics of different types of fluorescents differ considerably, they are significantly non-linear, and they change with age, making the coordination of multiple sets of lamps for smooth luminance changes from daylight to nightlight difficult. Also, the operating characteristics of the relatively large lamps used for high-level daylight illumination are temperature sensitive: slow to fire and less stable at lower temperatures than smaller lamps used for nightlighting.

Figure 1:
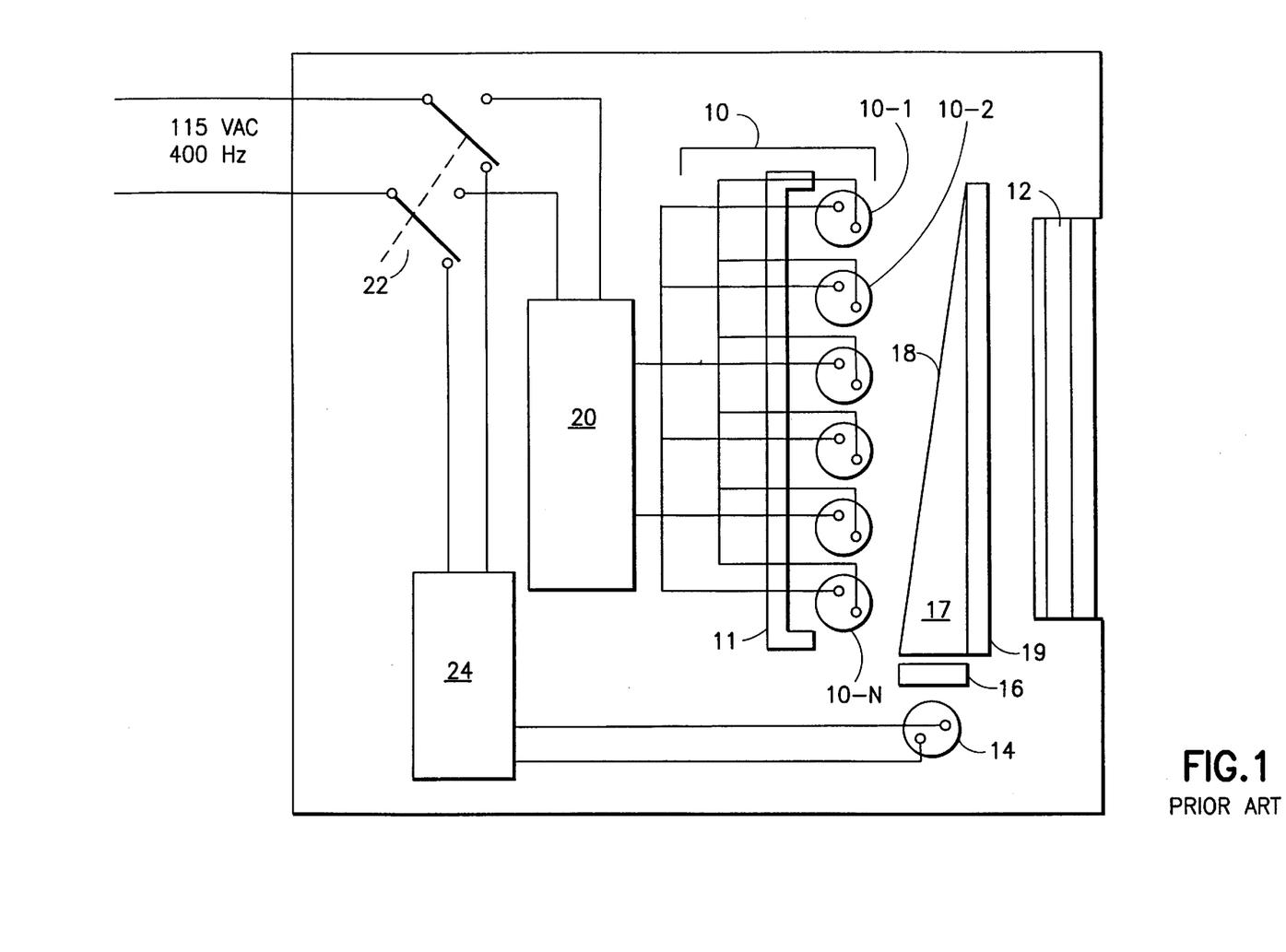
FIG. 1 is a schematic cross-section diagram of a prior art backlight display unit with indirect night lighting.

FIG. 1 illustrates a typical prior art scheme for indirect lighting for avionics displays. Prior art embodiments such as disclosed in the aforesaid U.S. Pat. No. 5,211,463 patent use bulky edge-lighted wedges 17 and/or half-silvered mirror surfaces 18 to redirect the light such as shown in FIG. 1. These devices permit the use of smaller night lamps, but result in a loss of energy efficiency in daylight operation and substantial penalties in increased weight and unit cost.

Another aspect of backlight display systems is that they should be compatible with night-vision goggles. Avionics displays must not saturate the high gain image intensifier detectors used by these goggles for night-vision imaging.

SUMMARY OF THE INVENTION

An object of the present invention is to provide a backlight display system having a display screen illuminated directly by high intensity daylight lamps and illuminated indirectly by lower intensity nightlight lamps positioned to reflect their light off the daylight lamps and onto the display screen.

Another object of the present invention is to provide a backlight display system including intensity gradient filters and/or distribution lenses to enhance the uniformity of reflected nightlight.

Still another object of the present invention is to provide a backlight display system including a brightness enhancement filter/diffuser disposed before a display screen.

A further object of the present invention is to provide a backlight display system employing photosensor controlled intensity feedback to provide smooth continuous dimming transition from a wide range of maximum to minimum intensity.

A still further object of the present invention is to provide a backlight display system including daylight lamps, nightlight lamps, and a third monochromatic nightlight lamp array for "class A" Night Vision Imaging System (NVIS) compatibility.

Another object of the present invention is to provide a backlight display system employing an override switch to assure that lighting restrictions needed for night-vision are maintained.

BRIEF DESCRIPTION OF THE DRAWINGS

In the drawings similar structures have similar reference numerals.

DETAILED DESCRIPTION OF THE PREFERRED EMBODIMENT

In FIG. 1, a typical prior art backlight display system is shown. The system includes a daylight illumination unit 10 including a plurality of lamps 10-1, 10-2 . . . 10-N connected to a daylight control circuit 20 that is connected to a power source through a switch 22. A nightlight illumination unit 14 is connected to nightlight control circuit 24 that is in turn connected to the power source via switch 22.

The daylight illumination is directed onto display screen 12 directly, however the nightlight illumination is applied indirectly by means of nightlight lamp 14 directing illumination onto a bulky edge lighted optical wedge 17 and/or a half-silvered mirror surface 19.

The prior art embodiments such as illustrated in FIG. 1 permit the use of smaller nightlight lamps, but result in a loss of energy efficiency in daylight operation and substantial penalties on increased weight and unit cost.

Figure 2:
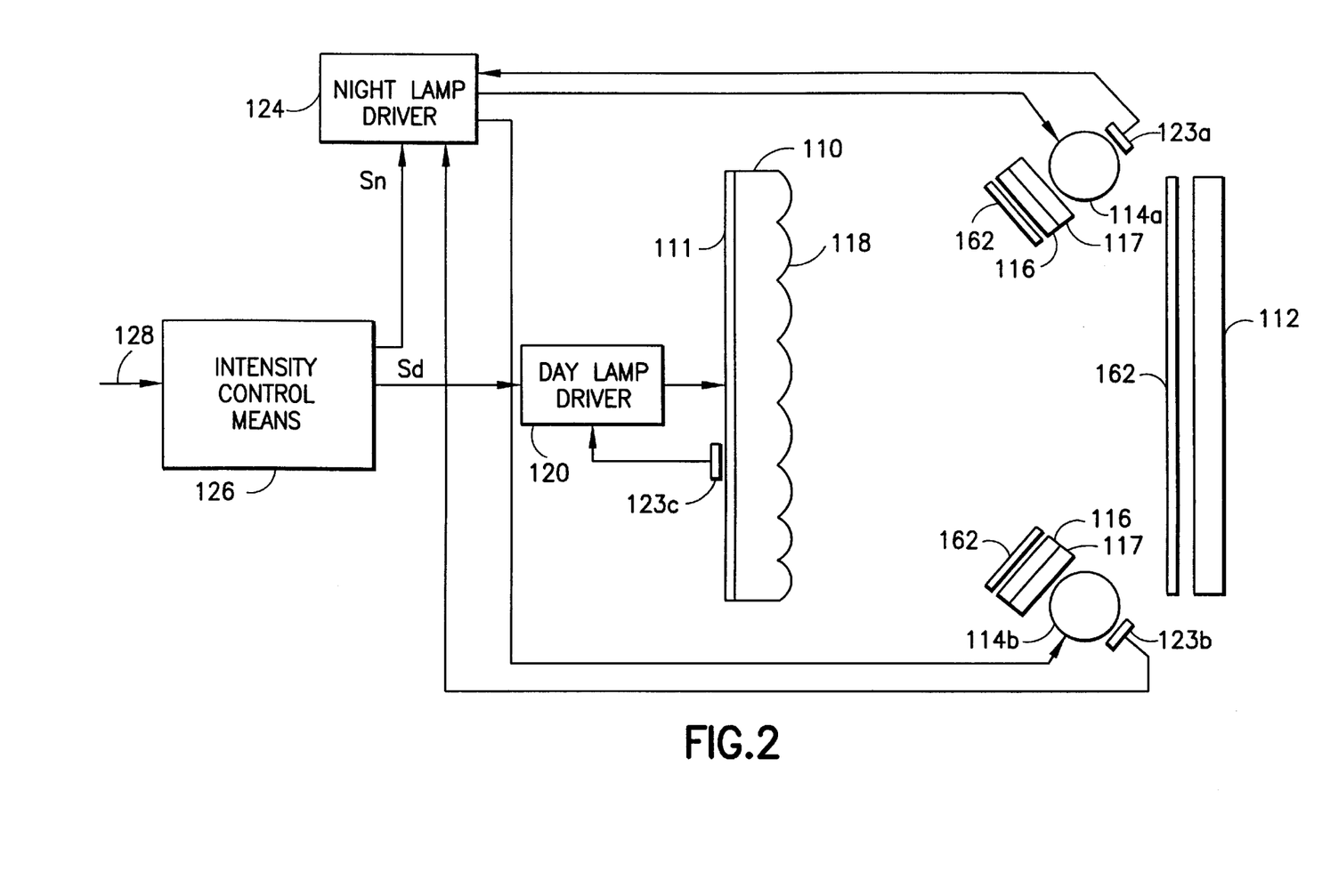
FIG. 2 is a schematic illustration of an embodiment of a brightlight display system according to the principles of the present invention.

FIG. 2 illustrates a first embodiment of a backlight display system according to the present invention.

Referring to FIG. 2, a high intensity fluorescent daylight lamp unit 110 is positioned relative to a liquid crystal display (LCD) screen 112 such that display screen 112 is illuminated directly by the light from lamp unit 110. Lamp unit 110 may be, for example, a straight or serpentine planar or tubular fluorescent lamp. If desired an optical filtering means 162 may be provided to remove unwanted ultraviolet, visible, or infrared radiation from the illumination transmitted to the display screen, for the purposes of environmental protection, color correction, NVIS compatibility, or other modification of the illumination. In FIG. 2, lamp unit 110 is shown in cross-section including a reflective backing 111 to increase energy efficiency and a rippled front surface 118 for even light distribution. Instead of a rippled surface, a smooth surface may be used for display screen 112 with a properly selected diffusing media.

Nightlight lamps 114a and 114b are located to the sides of, and between daylight lamp unit 110 and display screen 112 to provide low intensity night lighting and night vision goggle compatibility. Daylight lamp unit 110 is connected to day lamp driver means 120 and nightlight lamps 114a and 114b are connected to night lamp driver means 124. Lamp driver means 120 and 124 are connected to an intensity control means 126 which is, in turn, connected to a brightness control signal n input lead 128.

The nightlight illumination from each lamp 114a and 114b may be passed through a distribution lens 117 and/or an intensity gradient filter 116. The nightlight illumination may also pass through optical filter 162. The nightlight illumination is not transmitted directly to display screen 112. It is projected to and reflected off the surface of daylight lamp unit 110. Front surface 118 of daylight lamp unit 110 may include a reflective coating. The gradient filters 116 and the distribution lenses 117 provide even illumination of the surface 118 of daylight lamp unit 110.

In typical operation during daylight only, daylight lamp unit 10 is activated via day lamp driver means 120 and display screen 112 receives only high intensity daylight illumination. When a nighttime display is required, lower intensity nightlight lamps 114a and 114b are activated and the illumination from lamps 114a and 114b are reflected from the surface 118 of daylight lamp unit 110 and the combined daylight and nightlight illumination falls on display screen 112. A transition process takes place wherein the daylight lamp unit 110 is turned off, leaving only illumination from nightlight lamps 114a and 114b.

Photosensor devices 123a and 123b are provided to monitor the output levels of nightlight lamps 114a and 114b respectively. Photo sensor device 123c monitors the output level of daylight lamp unit 110. The electrical output signals from photo sensors 123a and 123b representative of the light levels of nightlight lamps 114a and 114b are connected to night lamp driver means 124 and the electrical output signal from photo sensor 123c representative of the light level of daylight lamp unit 110 are connected to daylight lamp driver means 120.

Intensity control means 126 is connected to and responsive to a "brightness command" signal on lead 128 which selects a desired intensity level. Intensity control means 126 provides a Sn (night) intensity level signal to night lamp driver means 124 and a Sd (day) intensity level signal to day lamp driver means 120.

Intensity control means 126, which is responsive to the brightness command signal on lead 128, contains a look-up table that contains the known characteristics of the particular type of drivers and lamps used in the system produces appropriate output intensity signals Sd and Sn as a function level of the brightness command signal on lead 128.

Intensity control means 126 contains a processor including a comparison means that compares the intensity levels of the daylight and nightlight lamps and the intensity level of the brightness command signal to generate the Sd and Sn signals.

The daylamp driver means 120 receives the daylight intensity signal Sd from intensity control means 126 and a signal from photosensor 123c representative of the actual brightness or intensity of daylight lamp unit 110. Daylight lamp driver means 120 includes a processor and a power delivery circuit for driving daylight lamp unit 110.

Likewise, nightlight driver 124 means receives the nightlight intensity signal Sn from intensity control means 126 and the signals from photosensors 123a and 123b representative of the actual brightness of nightlight lamps 114a and 114b. Nightlight lamp driver means 124 includes a processor and a power delivery circuit for driving nightlight lamp units 114a and 114b.

Processor controlled fluorescent lamp dimmers for LCD avionic displays of various types are known in the art. In U.S. Pat. No. 5,428,265 issued to Booth, Jr., et al., on Jun. 27, 1995 and incorporated herein by reference, a fluorescent lamp dimmer control processor circuit for varying the brightness of an LCD backlight display for ambient light conditions is described. The processor circuit in U.S. Pat. No. 5,428,265 includes light sensors, a look-up table, a processor and lamp drivers.

Figure 3A:
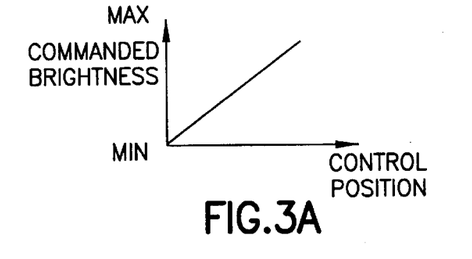
FIGS. 3A, 3B and 3C are illustrations of curves used in the explanation of the embodiment of FIG. 2.
Figure 3B:
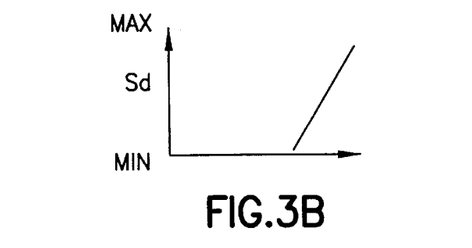
Figure 3C:
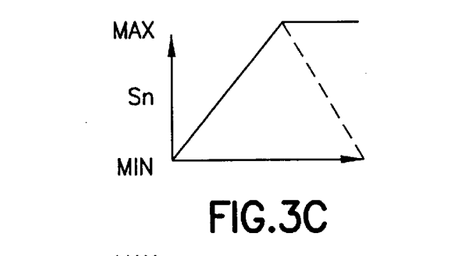

Referring to FIGS. 3A, 3B and 3C, curves are shown illustrating the relationship of the control position of the lamp driver means that controls the intensity of the daylight lamp 110 and nightlight lamps 114a and 114b versus the intensity level of the commanded brightness signal on lead 128. In FIG. 3A the straightline indicates the combination of the nightlight and the daylight lamp units. In FIG. 3B, the control position of the daylight lamp unit 110 as a function of the brightness or intensity signal Sd is illustrated, and in FIG. 3C, the control position of the nightlight lamps 114a and 114b as a function of brightness or intensity signal Sn is illustrated. In FIG. 3C, the dashed line indicates that the Sn signal can be ramped down at the point when Sd begins to increase in order to extend the life of the nightlamps.

Figure 4:
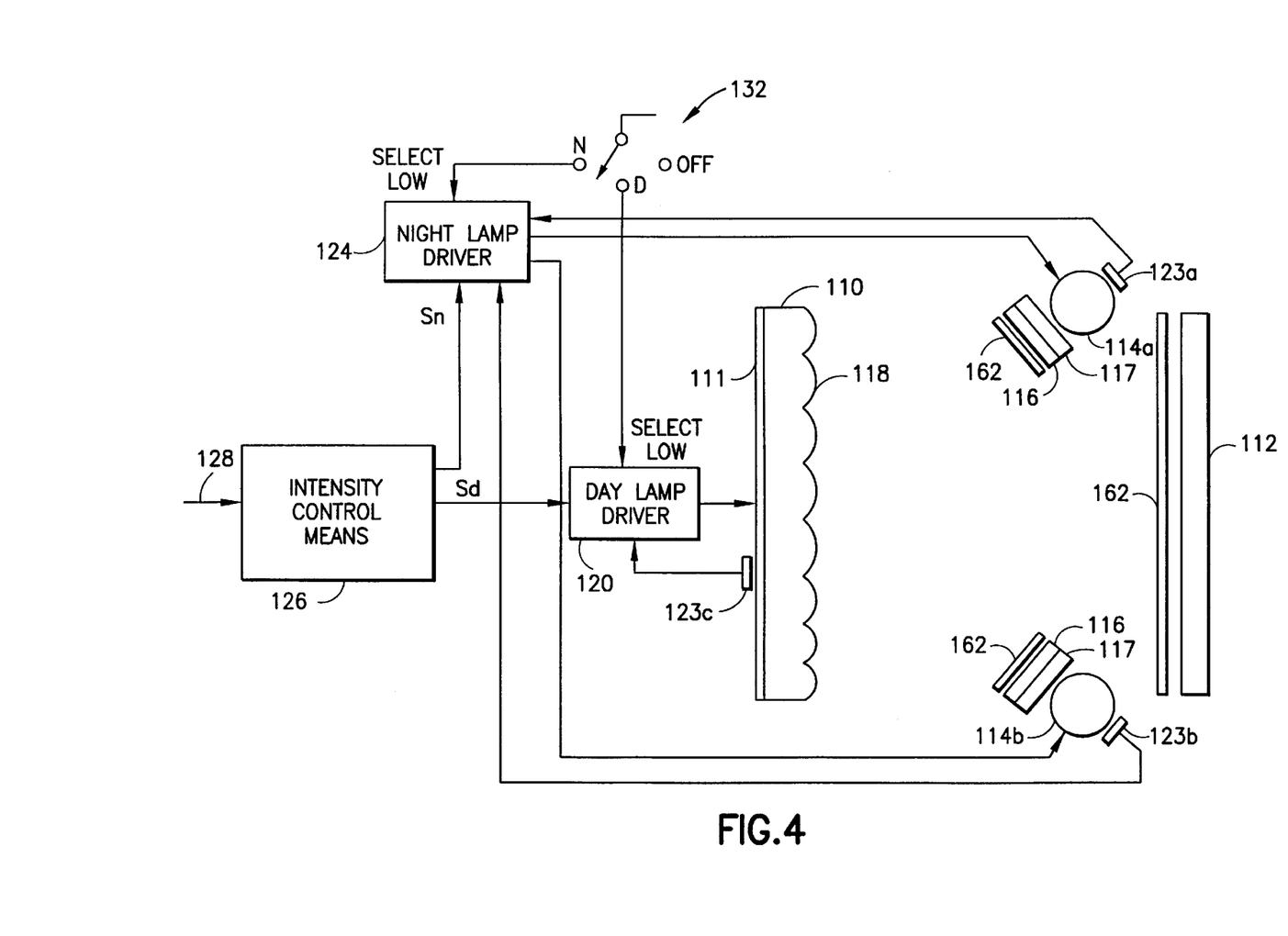
FIG. 4 is a schematic illustration of another embodiment of the present invention using a different lamp select means.

Referring now to FIG. 4, another embodiment of the system of FIG. 2 is illustrated further including a switch apparatus for selecting the illuminations for the LCD display screen 112. Switch 132 includes a "day select" position D and a "night select" position N as well as an "off" position. An enabling mod e select signal is applied via switch 132 to provide a "select low" signal to day lamp driver means 120 or a "select low" signal to night lamp driver means 124.

Figure 5:
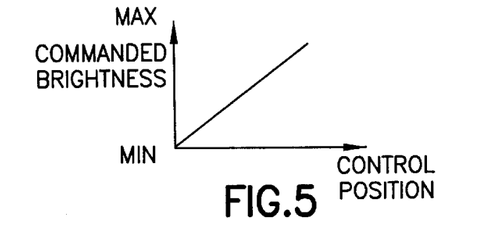
FIG. 5 is an illustration of a curve used in the explanation of the embodiment of FIG. 4.

Referring to FIG. 5, the relationship between the control position and the commanded brightness is illustrated.

Figure 6:
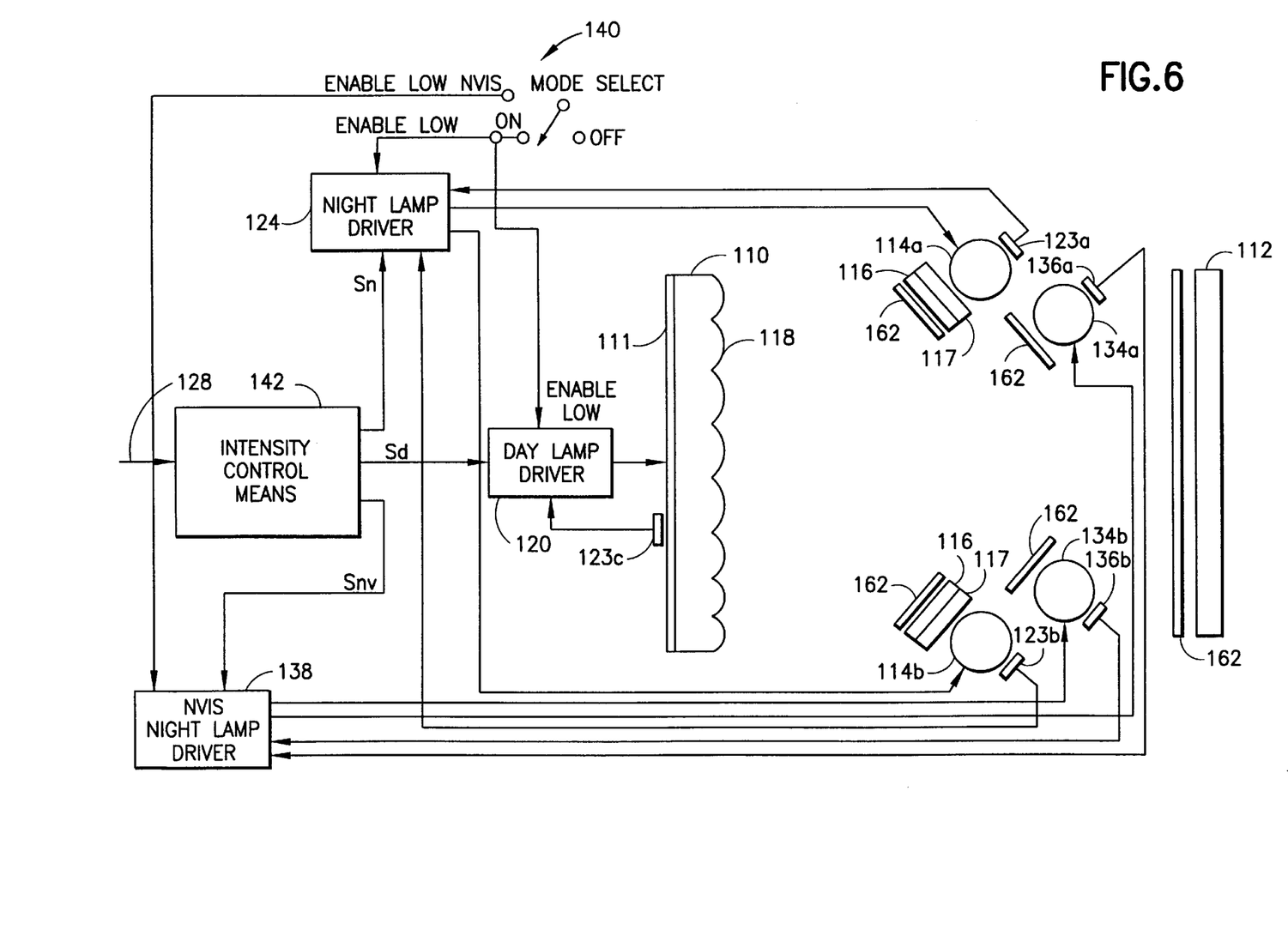
FIG. 6 is still another embodiment of the present invention employing NVIS lamps.

Referring to FIG. 6, another embodiment of the present invention is illustrated. In FIG. 6, Night Vision Imaging System (NVIS) illumination apparatus is included in the system illustrated in FIG. 4. A pair of NVIS night lamps 134a and 134b are positioned proximate to lamps 123a and 123b respectively, and photosensor devices 136a and 136b are disposed near NVIS lamps 134a and 134b respectively. NVIS lamps 134a and 134b are connected to NVIS night lamp driver means 138, which is also connected to the outputs of photosensor devices 136a and 136b. Switch 140 is similar to switch 132 of FIG. 4 except that is it includes an NVIS switch position connected to the NVIS lamp drives 138. Intensity control means 142 is essentially the same as intensity control means 126 of FIG. 4 except that the table look-up contained therein includes information to provide a $S_{NV}$ signal to NVIS night lamp driver 138.

The NVIS illumination feature of FIG. 6 is provided for use with "Class A", third generation, night vision goggles. As previously stated, the LCD display must not saturate the high gain image intensifier detectors included in the goggles.

More specifically, the displays must not radiate any appreciable energy in the red/near infra-red portion of the spectrum, specifically, wavelengths longer than 600 nm.

"Class A" Night Vision Imaging Systems (NVIS) standards require the use of green 550 nm monochromatic light for display illumination. Lighting for NVIS "Class B" operation includes red wavelengths as long as 610–615 nm. This provides good perceptual color separation and, mixed with blue and green, produces desirable white-light illumination. Ideally, an LCD display system should have sufficient range and linearity of response to automatically provide seamless integration of both classes of night-lighting with daylight illumination along a continuum, for the sake of flexibility.

The system illustrated in FIG. 6 provides daylight operation with daylight lamp unit 110, nightlight operation without night vision goggles using nightlight lamps 114a and 114b and NVIS operation with night vision goggles using NVIS lamps 134a and 134b. Smooth, continuous dimming transition occurs between daylight illumination and NVIS illumination using lamps 134a and 134b in the same manner as the previously discussed transition from daylight illumination to nightlight illumination using lamps 114a and 114b. The difference between the embodiment of FIG. 6 and the embodiment of FIG. 4 is that switch 140 is in the NVIS position. There is no "enable low" signal connected to the daylight and nightlight driver means 120 and 124.

Instead, the "enable low" signal is connected to and activates NVIS nightlight driver means 138.

Figure 7A:
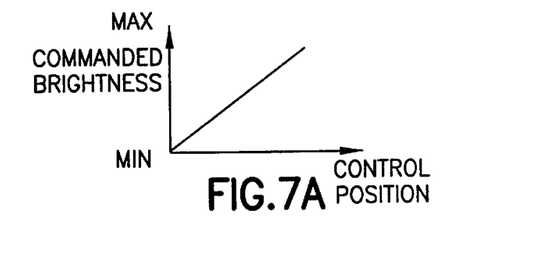
FIGS. 7A, 7B, 7C and 7D are illustrations of curves used in the explanation of the embodiment of FIG. 6.
Figure 7B:
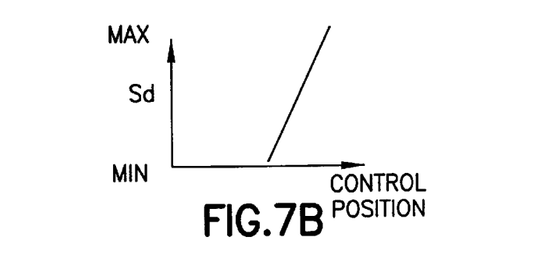
Figure 7C:
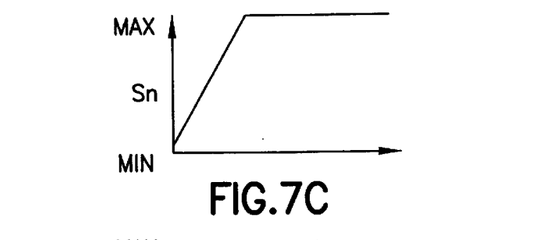
Figure 7D:
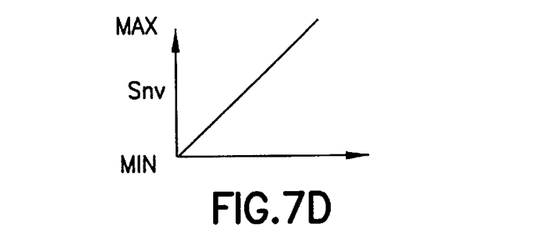

Referring to FIGS. 7A, 7B, 7C and 7D, the relationship between the control position and the commanded brightness is illustrated for the total system (7A), for the $S_d$ (daylight) operation, for the $S_n$ (nightlight) operation and also for the added NVIS feature where a $S_{nv}$ signal is applied to night-lamp driver means 138. In FIG. 7C, the Sn signal can be ramped down as illustrated in FIG. 3C.

Figure 8:
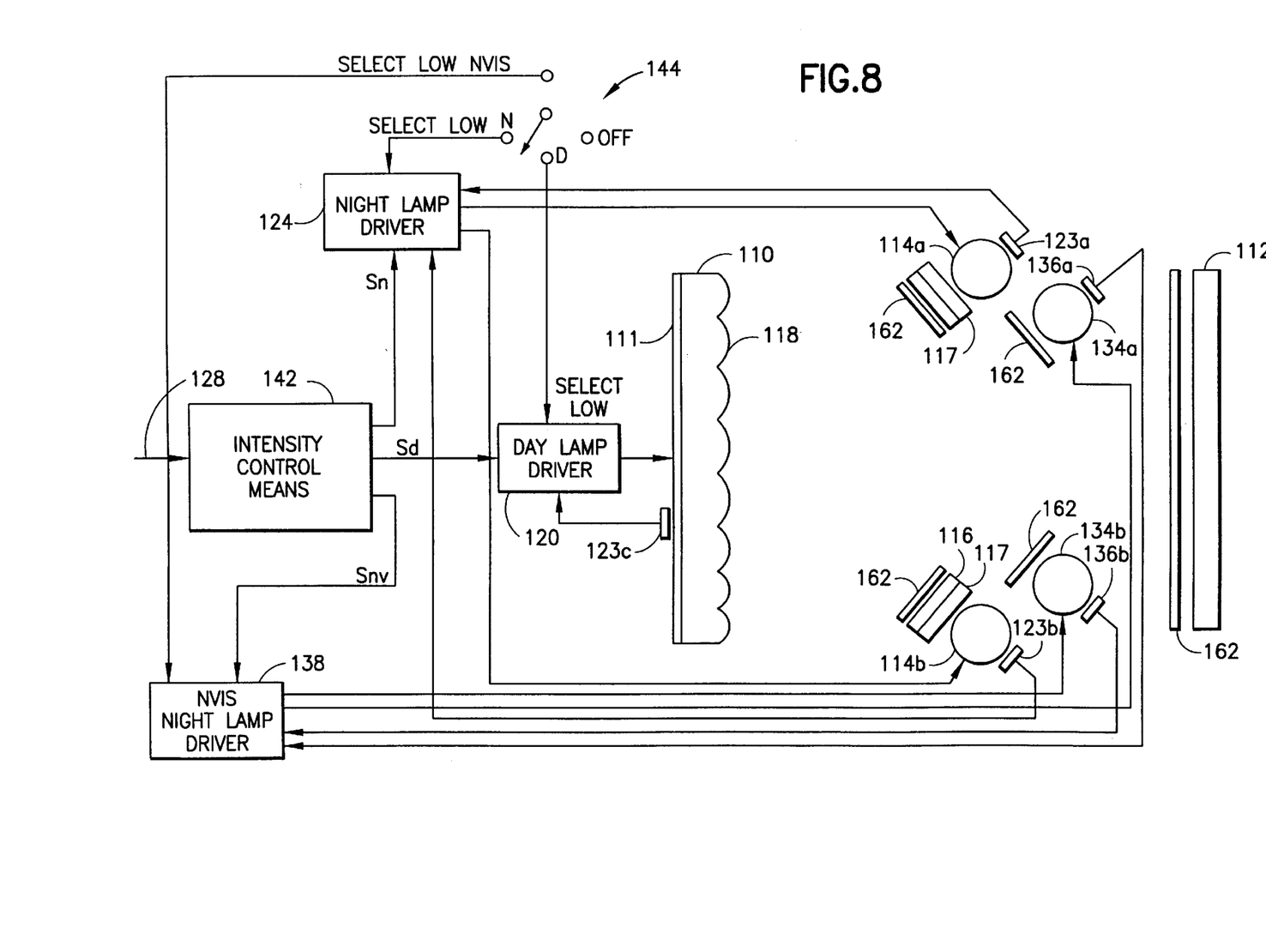
FIG. 8 is an illustration of still another embodiment of the present invention using NVIS lamps.

The embodiment of FIG. 8 is essentially the same as the embodiment shown in FIG. 6 except that in switch 144, separate positions are provided for daylight illumination (D) wherein a "select low" signal is applied to day lamp driver means 120 and for night lamp illumination (N) wherein a "select low" signal is connected to night lamp driver means 124. In FIG. 6, an "enable low" signal is provided to both daylamp driver 120 and nightlamp driver 124 when switch 140 is in the "on" position.

Figure 9:
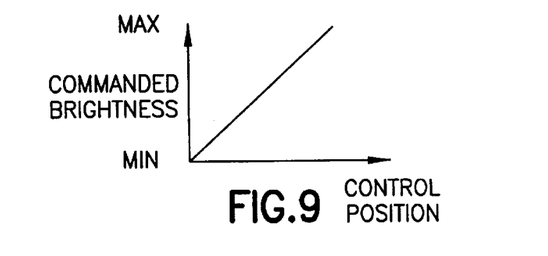
FIG. 9 is an illustration of a curve used in the explanation of FIG. 8.

FIG. 9 illustrates the relationship between control position and commanded brightness for the embodiment of FIG. 8.

Figure 10:
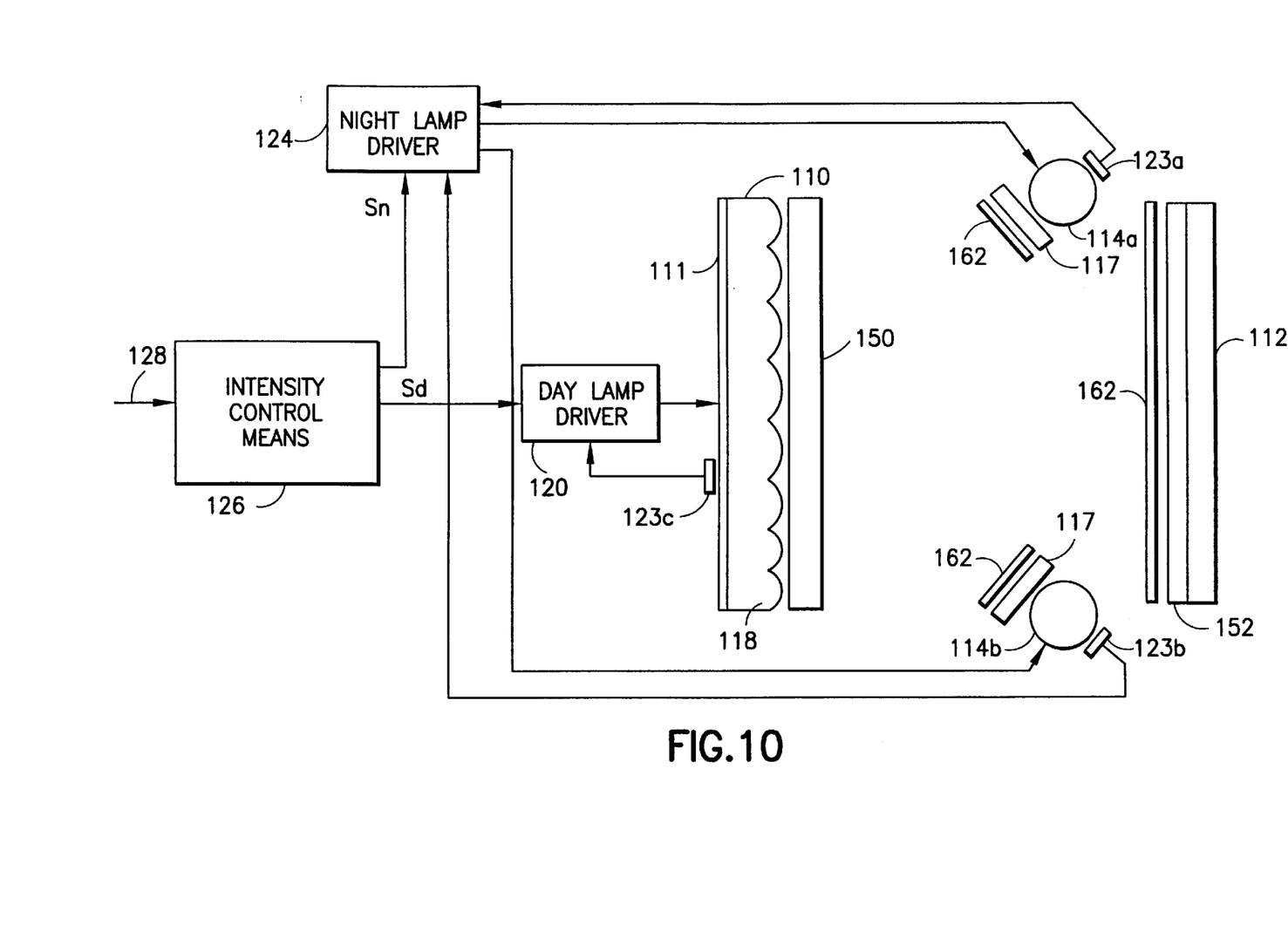
FIG. 10 is an illustration of a further embodiment of the present invention employing brightness enhancement filter diffusers.

FIG. 10 illustrates still another embodiment of the present invention, which is essentially the embodiment of FIG. 2 but wherein the intensity gradient filters 116 are not used. In the embodiment of FIG. 10, a brightness enhancement filter/diffuser element is placed in front of daylight lamp unit 110 so that the illumination from daylight lamp unit 110 passes through element 150 prior to reaching LCD display screen 112, and the illumination from the nightlight lamps 114a and 114b likewise pass through element 150. The brightness enhancement filter/diffuser element 150 serve to enhance the uniformity of the light directed to the LCD display screen 112.

The embodiment of FIG. 10 may also include a diffuser plate 152 in front of LCD display screen 112 which serves to scatter the light rays from the lamps to further create a uniform luminance for the display screen.

The invention has been described with particular reference to a presently preferred embodiment thereof, but it will be apparent to one skilled in the art that variations and modifications are possible within the spirit and scope of this invention. For example, straight or serpentine tubular fluorescent lamp units may be used to provide daylight illumination, and the "level select" signal input to the cross-fade logic may be provided by an ambient light sensor. The invention is defined by the claims appended below.

What is claimed is:

1. A wide intensity range dual illumination system for backlight displays comprising:

a backlight display screen;

a daylight fluorescent lamp means for directly illuminating said display screen with high intensity daylight illumination;

first photosensor means proximate to said daylight fluorescent lamp means for providing an electrical signal representative of the intensity of said daylight illumination;

at least one nightlight lamp means positioned between said daylight fluorescent lamp means and said display screen for directing low intensity nightlight illumination onto said daylight fluorescent lamp means wherein said low intensity nightlight illumination is reflected from said daylight fluorescent lamp means and onto said display screen;

a second photosensor means proximate to said nightlight lamp means for providing an electrical signal representative of the intensity of said nightlight illumination;

and control means connected to said daylight fluorescent lamp means, said nightlight fluorescent lamp means, said first and second photosensor means and to a brightness command signal, wherein said control means provides signals to said daylight fluorescent lamp means and said nightlight lamp means for providing a smooth transition from said high intensity daylight illumination to said low intensity nightlight illumination for continuous dimming of said illumination on said display screen from maximum to minimum intensity.

2. A dual illumination system according to claim 1 wherein said control means includes an intensity control means connected to said brightness command signal, a daylight lamp driver means connected to said intensity control means and said daylight fluorescent lamp means to provide a signal to said daylight fluorescent lamp means in response to a daylight intensity signal $S_D$ from said intensity control means for controlling the intensity level of said daylight illumination from said daylight fluorescent lamp means, and a nightlight lamp driver means connected to said intensity control means and said nightlight lamp means to provide a signal to said nightlight lamp means in response to a nightlight intensity control signal $S_N$ from said intensity control means for controlling the intensity level of said nightlight illumination from said nightlight lamp means.

3. A dual illumination system according to claim 2 wherein said nightlight lamp means includes a plurality of separate nightlamps and wherein said second photosensor means includes a plurality of separate photosensor devices each proximate to a separate nightlamp.

4. A dual illumination system according to claim 2 wherein said nightlight lamp means is a fluorescent lamp means.

5. A dual illumination system according to claim 2 wherein said nightlight lamp is an incandescent lamp, electroluminescent lamp, or other light-producing means.

6. A dual illumination system according to claim 2 further including a select switch means connected to said daylight lamp driver means and said nightlight lamp driver means for selectively actuating said daylight and nightlight driver means.

7. A dual illumination system according to claim 2 further including a Night Vision Imaging System lamp means positioned between said daylight fluorescent lamp means and said display screen for directing class B night vision imaging system compatible illumination onto said daylight fluorescent lamp means:

and a third photosensor means proximate to said NVIS lamp means for providing an electrical signal representatively of the intensity of the intensity of said NVIS lamp means illumination;

and wherein said control means is further connected to said NVIS lamp means and said third photosensor means.

8. A dual illumination system according to claim 7 further including an NVIS lamp driver means connected to said intensity control means and said NVIS lamp means;

and a select switch means connected to said daylight lamp driver means, said nightlight lamp driver means and said NVIS lamp driver means for selectively actuating said daylight, nightlight and NVIS driver means.

9. A dual illumination system according to claim 2 further including light distributing means located between said nightlight lamp means and said daylight fluorescent lamp means for modifying said light from said nightlight lamp means to said daylight fluorescent lamp means so that the light reflected to said display screen is evenly distributed.

10. A dual illumination system according to claim 2 further including a brightness-enhancement means placed proximate to said at least one nightlight lamp means so that light from said nightlight lamp means is directed through the brightness-enhancement means to said display element.

11. A dual illumination system according to claim 9, wherein said light distributing means is an intensity-gradient filter.

12. A dual illumination system according to claim 9, wherein said light distributing means is a light-distribution lens.

13. A dual illumination system according to claim 7 further including an optical filtering means placed proximate to said nightlight lamp means and said display screen so that light from said daylight and night light lamp means is directed through said filtering means to said display screen to remove unwanted radiation from the nightlight lamp means for the purpose of compatibility with Night Vision Imaging System Classes A and/or B lamps for color correction of said illumination, for protection of the said display screen against unwanted radiation initially emitted from said daylight and nightlight lamp means, or for other modification of said illumination.

14. A dual illumination system according to claim 13 further including a second nightlight lamp means proximate to said at least one nightlight lamp means and a third photosensor means proximate to said second nightlight lamp means for providing illumination means for use of said display screen during daytime operation, nighttime operation, nighttime operation with Class B NVIS devices, and night- time operation with Class A NVIS devices.

15. A dual illumination system according to claim 14 wherein said second nightlight lamp means includes a plurality of separate nightlamps and wherein said third photosensor means includes a plurality of separate photosensor devices each proximate to a separate nightlamp of said second nightlight lamp means.

* * * * *